United States Patent [19]

Bauer et al.

[11] Patent Number: 4,765,814

[45] Date of Patent: Aug. 23, 1988

[54] PROCESS FOR PURIFICATION OF A GAS STREAM BY A NITROGEN SCRUBBING

[75] Inventors: Heinz Bauer; Hans Becker, both of Munich; Walter Scholz, Wolfratshausen, all of Fed. Rep. of Germany

[73] Assignee: Linde Aktiengesellschaft, Wiesbaden, Fed. Rep. of Germany

[21] Appl. No.: 84,249

[22] Filed: Aug. 12, 1987

[30] Foreign Application Priority Data

Aug. 13, 1986 [DE] Fed. Rep. of Germany ....... 3627427

[51] Int. Cl.$^4$ ................................................ F25J 3/02
[52] U.S. Cl. ........................................... 62/20; 62/38; 62/40; 62/41
[58] Field of Search ...................... 62/9, 11, 17, 20, 23, 62/24, 29, 31, 32, 36, 38, 40–41, 42; 55/68, 69

[56] References Cited

U.S. PATENT DOCUMENTS 3,312,075 4/1967 Becker ................................ 62/41 X

FOREIGN PATENT DOCUMENTS 1963297 6/1971 Fed. Rep. of Germany .

Primary Examiner—Steven E. Warner
Attorney, Agent, or Firm—Millen & White

[57] ABSTRACT

In a process proposed for purification of a gas stream at elevated pressure by nitrogen scrubbing, the gas stream to be purified and the nitrogen scrubbing stream are initially cooled to low temperatures. The gas stream is then scrubbed with liquid nitrogen and the purified gas stream is mixed with cooled, high-pressure nitrogen to form a mixture in which nitrogen accumulates partly as a liquid phase. The mixture thus formed is then heated and the liquid nitrogen contained therein is evaporated. Prior to scrubbing, either the nitrogen scrubbing stream itself or a partial stream of the nitrogen scrubbing stream or another process stream under a pressure lower than the working pressure of the nitrogen scrubbing step is at least partly condensed and then pumped to a higher pressure. The condensation of this low-pressure stream provides a reduction in the temperature difference at the cold end of the heat exchangers upstream of the scrubbing step resulting in the reduction of the energy requirements of the process.

23 Claims, 6 Drawing Sheets

PROCESS FOR PURIFICATION OF A GAS STREAM BY A NITROGEN SCRUBBING

BACKGROUND OF THE INVENTION

This invention relates to a process for the purification of a gas stream at elevated pressure by nitrogen scrubbing. The gas stream and nitrogen are cooled to low temperatures and then the gas stream is scrubbed with liquid nitrogen. The purified gas stream is mixed with cold nitrogen which is under elevated pressure to form a mixture, in which nitrogen accumulates partly in liquid form. The thus formed gas mixture is reheated by heat exchange with the gas stream to be cooled and the nitrogen to be cooled.

Nitrogen scrubbing is used especially in the production of ammonia synthesis gas, in which a raw or impure hydrogen stream containing for example, small amounts of carbon monoxide, methane, argon and other components, which interfere with ammonia synthesis or otherwise represent undesirable materials, is scrubbed with liquid nitrogen. In this case, a purified hydrogen stream is produced which is laden with a part of the scrubbing nitrogen. Since the amount of nitrogen taken up by the hydrogen stream during scrubbing is not sufficient to achieve the stoichiometric ratio of nitrogen to hydrogen necessary for the ammonia synthesis, additional cold nitrogen is mixed with the product cold gas stream discharged from the scrubbing according to a known process and this mixture is then heated again (DE-PS No. 19 63 297, herein incorporated by reference).

In such a process, prior to the scrubbing step, the hydrogen stream and scrubbing nitrogen stream usually are cooled under basically the same pressure, for example at a pressure between 10 and 150 bars, especially at pressures between 20 and 80 bars. During cooling, the nitrogen is condensed or, the pressure level is above the critical pressure, is supercritically cooled, i.e. the density of the cold nitrogen increases substantially without phase transition. When it is fed into the scrubbing column or is mixed with the purified gas a mixture then results, which in any case is subcritical, as the critical point of this mixture of hydrogen and nitrogen is substantially higher than that of the pure components. As result a phase separation takes place and a liquid nitrogen-rich phase accumulates.

A disadvantage of the known process is that in the area of the cold end of the process, in other words in the coldest part of the heat exchanger upstream from the nitrogen scrubbing, large temperature differences occur. These large temperature differences are caused by the fact that the liquid nitrogen portion contained in the mixture is evaporated at its relatively low partial pressure and accordingly at a very low temperature, while the nitrogen to be cooled, which has a higher partial pressure is condensed at a higher temperature or supercritically cooled.

This is made clear by FIG. 1, in which the Q-T courses are qualitatively indicated. Q represents the heat gained or lost by the individual streams during heat exchange and T, of course, represent the temperatures of the streams. Thus, a sharp break occurs in the nitrogen cooling curve at the condensation temperature, which indeed is somewhat flattened at the supercritical state of the nitrogen, but without anything being qualitatively changed in this case, provided very high pressures are not used. The sharp break for cooling at a pressure below the critical pressure is given by the condensation enthalpy whereas the flattened shape of the curve for cooling at a pressure above the critical pressure reflects the increase of the specific heat content in the critical region.

On the other hand, evaporation of the nitrogen in the formed mixture takes place at variable temperature and consequently at a relatively flat course of the warming curve. As a result, large distances between the warming and cooling curve necessarily occur. The temperature differences thus occurring in the area of the cold end of the heat exchanger may reach values of over 20° C. and therefore are connected with large energy losses.

SUMMARY OF THE INVENTION

An object of this invention is to provide a process of the type initially mentioned wherein the temperature difference in the area of the cold end of the heat exchanger and the resultant energy losses associated therewith are reduced.

Upon further study of the specification and appended claims, further objects and advantages of this invention will become apparent to those skilled in the art.

These objects are achieved by evaporating the liquid nitrogen contained in the mixture by heat exchange with the gas stream to be cooled and the scrubbing nitrogen to be cooled, and either the scrubbing nitrogen stream to be cooled or a partial stream thereof, or another process stream under a pressure lower than the working pressure of the nitrogen scrubbing step is at least partly condensed and then pumped to higher pressure.

Thus according to the invention, in contrast with the usual procedure, it is additionally proposed to use the evaporation heat of the nitrogen contained in the mixture, liquefied by the expansion to the partial pressure prevailing in the mixture, for the condensation of a low-pressure process stream, in which first of all a great freedom exists in the choice of a suitable low-pressure stream. By the small temperature differences in the area of the cold end of the heat exchanger possible in the process according to the invention it is possible at this point to save energy which can either be used to reduce the energy requirement of the total installation or to allow considerable temperature differences on the warm end of the heat exchangers. The latter possibility leads to a markedly smaller heat exchanger. Of course, it is also possible to make partial use of the two opposing possibilities to attain an economical optimum.

As opposed to the process of the prior art wherein the temperature differences in the cold end of the heat exchanger may reach up to 20° C., the process according to the invention provides temperature differences at the cold end of the heat exchanger in the range of generally only about 0.1° to 15° C., preferably 0.2° to 10° C., and especially 1° to 5° C.

In a first preferred embodiment of the invention the additional condensation step is achieved with low-pressure nitrogen. For this purpose, a nitrogen stream at low pressure is cooled and condensed and then is pumped by means of a pump to the pressure of the scrubbing nitrogen stream and mixed therewith after the scrubbing nitrogen stream is cooled. This aspect of the invention has the advantage that as a result the amount of nitrogen introduced under elevated pressure can be reduced. Thus, the energy required for compression of the high-pressure nitrogen is reduced. The expensive gas compression is replaced by the conveying of the condensed low-pressure nitrogen stream by means of a pump to the pressure of the high-pressure scrubbing nitrogen stream which can be carried out much more favorably from an energy aspect.

In another preferred embodiment of the invention a partial stream is branched off from the high-pressure nitrogen, work expanded to a low pressure, e.g., in a turbo expander, and then condensed according to the invention. The resultant liquid nitrogen in this case is also brought by means of a pump to the pressure of the high-pressure nitrogen stream and mixed therewith before the nitrogen scrubbing step. In the course of this aspect of the invention the total nitrogen stream must first be compressed to the elevated pressure, but in the productive expansion of the branched partial stream additional energy and coldness result.

In a third preferred embodiment of the invention the pressure of the nitrogen feed stream can differ appreciably from the pressure of the nitrogen scrubbing. In this embodiment a nitrogen stream supplied e.g. at a lower intermediate pressure is first work expanded and then condensed according to the invention, whereupon the liquid nitrogen thus accumulating is pumped to the necessary high pressure.

In another preferred embodiment of the invention the condensation of a low-pressure process stream is performed by insertion of a circuit in which a working medium is evaporated at high pressure, then work expanded, then condensed at low pressure and finally again pumped to a high pressure. In this case, especially nitrogen or the residual gas accumulating in the bottom of the scrubbing column during a nitrogen scrubbing is suitable as a working medium. The working medium in this case can be fed in either a closed or an open circuit. If it is fed in an open circuit, the residual gas of the nitrogen scrubbing is particularly recommended as a working medium. The residual gas accumulating in this case in the bottom of the nitrogen scrubbing as a loaded nitrogen stream is first advantageously evaporated under pressure, then work expanded and partially condensed. The liquid phase thus formed is then again delivered by means of a pump to the residual gas pressure and fed into the open circuit. An amount corresponding to the feeding of fresh residual gas must be discharged from the circuit, which preferably takes place following the working expansion. In the course of this process embodiment, it is further favorable to perform at elevated pressure the mixing of the circuit medium with the residual gas after evaporation of the circuit medium.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DETAILED DESCRIPTION

Figure 1:
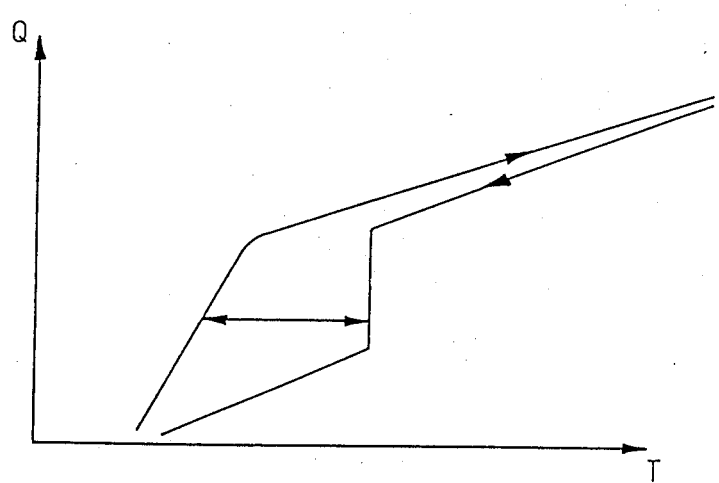
FIG. 1 shows a total Q-T diagram for the prior art process comprising the cooling curve for the raw gas stream and the high-pressure nitrogen and the warming curve for the mixture coming from the nitrogen scrubbing and for the residual gas.
Figure 2:
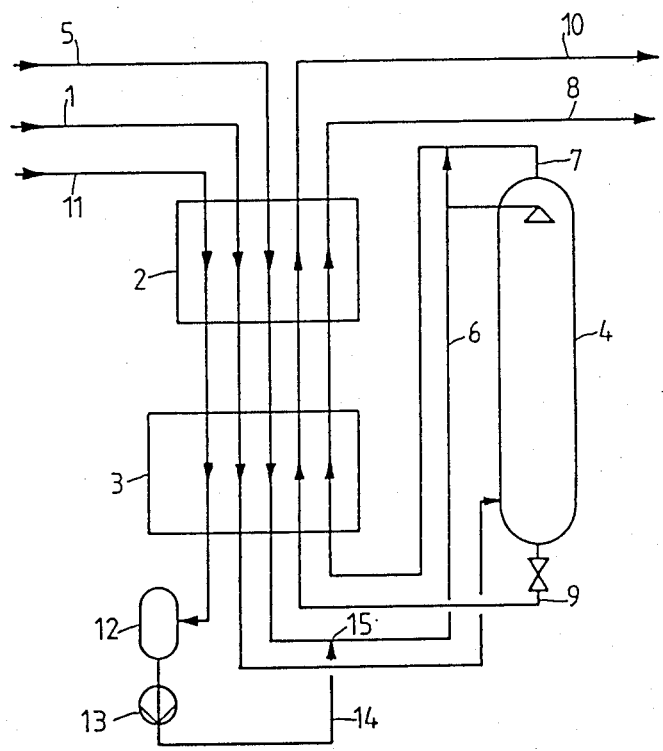
FIG. 2 illustrates an embodiment of the process according to the invention wherein a separate low-pressure nitrogen stream is cooled, condensed, and then pumped to the pressure of the high-pressure nitrogen stream.

In FIG. 2 the raw feed gas to be purified is fed at a pressure of about 30 bar and a temperature of about 30° C. by pipe 1, cooled first in heat exchanger 2 to a temperature of about $-150°$ C. and then in heat exchanger 3 to a low temperature of about $-190°$ C. The raw gas is fed into a lower portion of a nitrogen scrubbing column 4. Parallel to this, high-pressure nitrogen, which is at approximately the same pressure as the raw feed gas and at a temperature of 30° C., is fed by pip 5, and after cooling in heat exchangers 2 and 3 to a temperature of $-190°$ C. is fed by pipe 6 to the top of nitrogen scrubbing column 4, where a part of the high-pressure nitrogen is fed as scrubbing liquid. The nitrogen, supercritical in many cases, form, when fed into nitrogen scrubbing column 4, a subcritical mixture with the raw gas, and a nitrogen-rich liquid phase is formed. This liquid flows through the scrubbing column countercurrent to the rising gas mixture and thus scrubs out the undesirable components of the gas mixture, for example, carbon monoxide, methane, argon or other impurities from the raw hydrogen stream. The purified gas mixture is discharged from the top of nitrogen scrubbing column 4 by pipe 7 at a temperature of about $-195°$ C. The purified gas mixture is mixed with a partial stream of cooled high-pressure nitrogen fed into pipe 7 by pipe 6, for example, in a hydrogen purification process for the production of ammonia synthesis gas to adjust the ratio of hydrogen and nitrogen to that of the stoichiometric ratio necessary for ammonia synthesis. In the mixing, the nitrogen fed by pipe 6 also forms a subcritical mixture with the top product stream of the column resulting in the formation of a liquid phase containing predominantly nitrogen. The two-phase mixture is heated to a temperature of about 27° C. in heat exchangers 3 and 2 countercurrent to the gas streams to be cooled, and the liquid phase is evaporated in the lower area of heat exchanger 3, i.e., in the area of the cold end of the process. The heated gas mixture is finally removed as a product stream by pipe 8.

In the bottom of nitrogen scrubbing column 4, scrubbing nitrogen loaded with scrubbed-out components accumulates. The loaded nitrogen is removed by pipe 9, evaporated and heated in heat exchanger 3, and after further heating in heat exchanger 2, to a temperature of about 27° C., is finally delivered as residual gas by pipe 10.

In contrast with the part described so far of the embodiment represented in FIG. 2, which corresponds to a conventional nitrogen scrubbing, according to the invention a low-pressure nitrogen stream at a pressure of about 5 bar and a temperature of about 30° C. is additionally fed by pipe 11 and cooled and condensed in heat exchangers 2 and 3 to a temperature of about −190° C. The condensate is collected in container 12 and pressurized by pump 13 to the pressure of the high-pressure nitrogen stream in pipe 5. This nitrogen stream is then fed by pipe 14 into the cold high-pressure nitrogen stream at 15 so that it is fed jointly with the high-pressure nitrogen stream to the nitrogen scrubbing by pipe 6.

For FIG. 2 the temperature level between exchangers 2 and 3 was of minor importance. The embodiment according to FIG. 3 now asks for a temperature in stream 16 which will not cause liquid formation in the expansion turbine 17.

Figure 3:
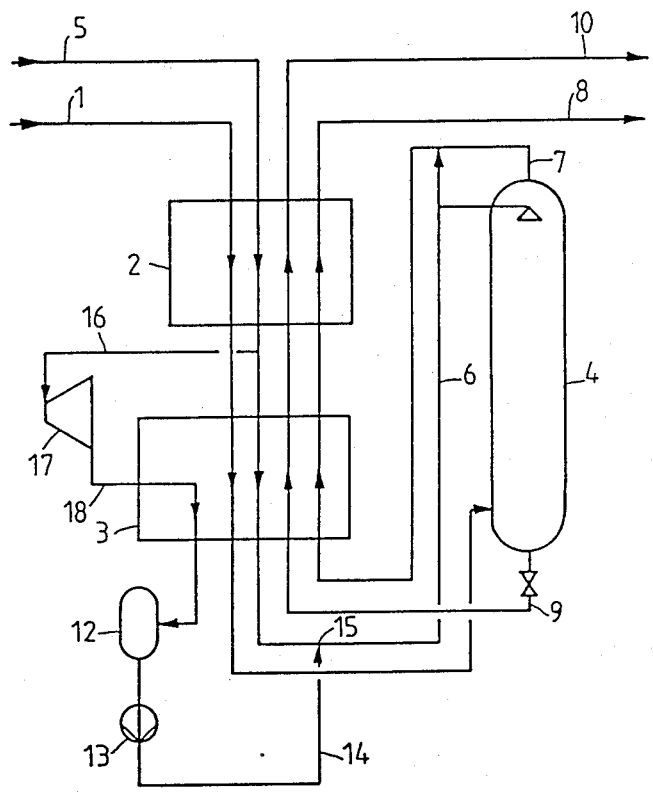
FIG. 3 illustrates an embodiment of the process according to the invention wherein a partial stream of the high-pressure nitrogen stream is expanded, condensed and then pumped to the pressure of the high-pressure nitrogen stream.

The embodiment of the invention represented in FIG. 3 differs from that according to FIG. 2 in that no separate low-pressure nitrogen stream is prepared, but, instead a partial stream 16 is branched off from the high-pressure nitrogen stream in pipe 5 after precooling in heat exchanger 2 and work expanded in an expansion turbine 17 to a pressure of about 5 bar. The cold low-pressure gas accumulating in this case is fed by pipe 18 to the cold part of heat exchanger 3 and condensed therein. The condensate thus formed is again further treated as in the embodiment according to FIG. 2.

Figure 4:
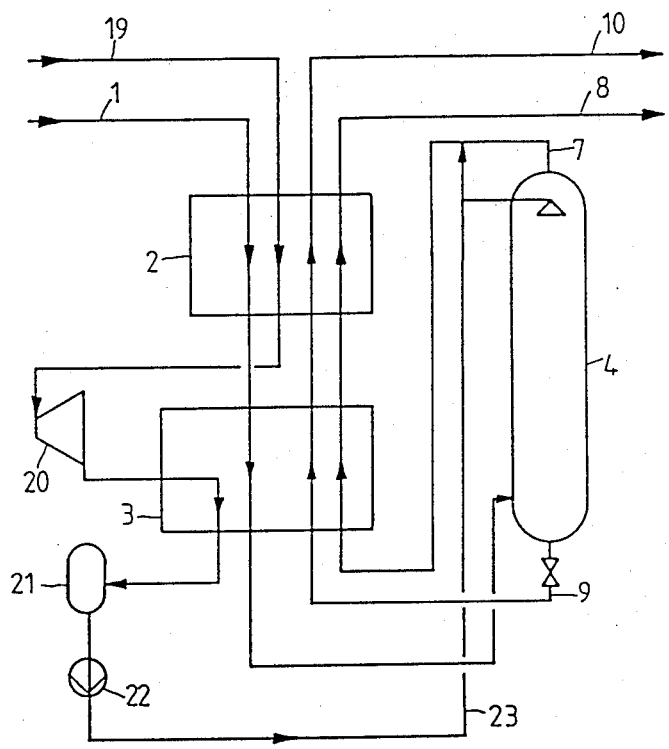
FIG. 4 illustrates an embodiment of the process wherein nitrogen is introduced to the system as an intermediate pressure stream which is then expanded, condensed, and pumped to the pressure of the scrubbing step.

In the embodiment of the invention represented in FIG. 4 an intermediate-pressure nitrogen stream (about 15 bar) is fed by pipe 19 and, after cooling in heat exchanger 2, is expanded in its entirety in an expansion turbine 20 to a pressure of 5 bar. The resultant cold low-pressure gas is again condensed in heat exchanger 3 and fed by container 21 to a pump 22 and is pumped to the pressure of the nitrogen scrubbing, before it is fed to nitrogen scrubbing 4 by pipe 23.

Figure 5:
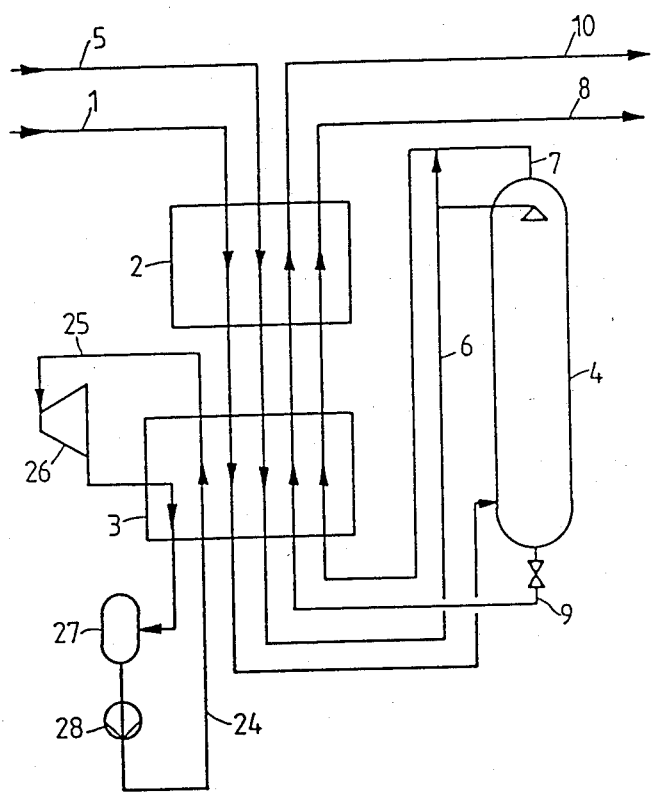
FIG. 5 illustrates an embodiment of the process wherein a closed circuit is employed for condensation of a low-pressure stream.

In the embodiment according to FIG. 5, a closed circuit in which a working medium in pipe 24 is evaporated under a pressure of about 30 bar in heat exchanger 3, after which it is fed by pipe 25 to an expansion turbine 26 and work expanded therein to a pressure of about 5 bar. The expanded low-pressure working medium is then condensed in the cold part of heat exchanger 3 and delivered to a container 27. The condensate is then pressurized to the elevated pressure by a pump 28 and carried again in the circuit by pipe 24.

Potential working media are e.g. nitrogen, carbon monoxide, methane and their mixtures.

Figure 6:
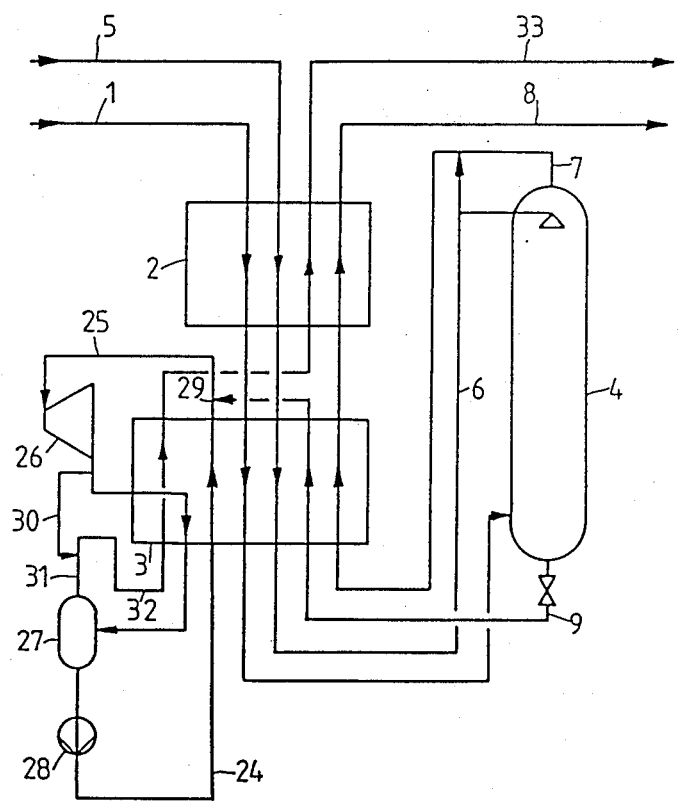
FIG. 6 illustrates an embodiment of the invention wherein an open circuit of a residual gas stream is employed for condensation of a low-pressure stream.

The embodiment of the invention represented in FIG. 6 differs from that according to FIG. 5 in that the circuit is open and contains as the working medium the loaded nitrogen removed by pipe 9 from nitrogen scrubbing column 4. The loaded nitrogen removed by pipe 9 is thus first evaporated in heat exchanger 3 to form a residual gas stream and then fed into the circuit at 29. After the work expansion of the circuit gas/residual gas mixture to a pressure of 5 bar, a portion of the mixture is condensed in heat exchanger 3. The resultant condensate and gaseous fraction are separated in container 27. The resultant gas mixture is removed by pipe 32, warmed in heat exchangers 2 and 3 and finally is delivered as residual gas by pipe 33. The condensate is pressurized by pump 28 and returned to the open circuit via pipe 24. The gaseous fraction is removed by pipe 31 mixed with a portion of the circuit gas/residual gas mixture which was branched off prior to condensation (pipe 30).

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions.

What is claimed is:

1. In a process for the purification of an impure gas stream at elevated pressure by nitrogen scrubbing comprising cooling an impure feed gas stream and a nitrogen scrubbing stream; scrubbing said impure gas stream with said nitrogen scrubbing stream at elevated pressure; mixing the purified gas stream with cooled, pressurized nitrogen to form a mixture in which nitrogen accumulates partly in a liquid phase; heating said mixture by heat exchange with the impure gas stream to be cooled and the nitrogen scrubbing stream to be cooled; evaporating the liquid nitrogen phase of said mixture by heat exchange with the impure gas stream to be cooled and the nitrogen scrubbing stream to be cooled;

the improvement wherein the liquid nitrogen phase of said mixture is evaporated by heat exchange with another stream in addition to said impure gas stream and said nitrogen scrubbing stream, said another stream is at a pressure lower than the scrubbing pressure and is at least partly condensed by heat exchange with said mixture and then pumped to an elevated pressure.

2. A process according to claim 1, wherein said another stream is a nitrogen stream which, after its condensation, is pumped to the scrubbing pressure and mixed with said nitrogen scrubbing stream.

3. A process according to claim 1, wherein said impure gas stream, nitrogen scrubbing stream and lower pressure stream are cooled in heat exchangers and the temperature difference at the cold end of said exchangers is about 0.1°–15° C.

4. A process according to claim 1, wherein said impure gas stream, nitrogen scrubbing stream and lower pressure stream are cooled in heat exchangers and the temperature difference at the cold end of said exchangers is about 0.2°–10° C.

5. A process according to claim 1, wherein said impure gas stream, nitrogen scrubbing stream and lower pressure stream are cooled in heat exchangers and the temperature difference at the cold end of said exchangers is about 1°–5° C.

6. A process according to claim 1, wherein said impure gas stream to be cooled and said nitrogen scrubbing stream to be cooled are at substantially the same pressure.

7. A process according to claim 1, wherein said impure gas stream to be cooled and said nitrogen scrubbing stream to be cooled each have a pressure of 10–150 bars.

8. A process according to claim 1, wherein said mixture is discharged from said process at elevated pressure without undergoing work expansion.

9. A process according to claim 1, wherein said another stream is a partial stream of said nitrogen scrubbing stream and after its condensation, said partial stream is pumped to the scrubbing pressure and mixed with said nitrogen scrubbing stream.

10. A process according to claim 1, wherein said another stream is said nitrogen scrubbing stream which, after its condensation, is pumped to the scrubbing pressure.

11. A process according to claim 9, wherein, the partial nitrogen stream is expanded to a pressure lower than the scrubbing pressure during which work is extracted.

12. A process according to claim 10, wherein said nitrogen scrubbing stream is first partially cooled and expanded to extract work prior to being condensed by heat exchange with said gas mixture.

13. A process according to claim 1, wherein said another stream is a working medium which is evaporated in a circuit at elevated pressure, expanded to a lower pressure during which work is extracted, condensed and then pumped to an elevated pressure wherein, evaporation and condensation of said working medium are performed by heat exchange with said mixture.

14. A process according to claim 13, wherein said circuit is closed and said working medium is a nitrogen stream or a bottom product from said nitrogen scrubbing.

15. A process according to claim 13, wherein said working medium is a stream of nitrogen, carbon monoxide, methane or mixtures thereof.

16. A process according to claim 13, wherein a loaded nitrogen stream discharged from the bottom of said nitrogen scrubbing, which forms a residual gas upon evaporation, is used as said working medium and said circuit is open.

17. A process according to claim 16, wherein, after evaporation of said loaded nitrogen stream, the resultant residual gas is extended and partially condensed to form a liquid phase and said liquid phase is pumped to the pressure of said residual gas and mixed therewith.

18. A process according to claim 17, wherein excess residual gas, after expansion, is discharged from the circuit.

19. A process according to claim 17, wherein said liquid phase is evaporated before being mixed with said residual gas.

20. A process according to claim 19, wherein excess residual gas, after expansion, is discharged from the circuit.

21. In a process for the purification of an impure gas stream at elevated pressure by nitrogen scrubbing comprising cooling an impure feed gas stream and a nitrogen scrubbing stream;
scrubbing said impure gas with said nitrogen scrubbing stream at elevated pressure;
mixing the purified gas streams with cool, pressurized nitrogen to form a mixture in which nitrogen accumulates partly in a liquid phase;
heating said mixture by heat exchange with the impure gas stream to be cooled and the nitrogen scrubbing stream to be cooled; and
evaporating the liquid nitrogen phase of said mixture by heat exchange with the impure gas stream to be cooled and the nitrogen scrubbing stream to be cooled;
the improvement comprising:
at least partially condensing an additional nitrogen stream, which is at a pressure lower than the scrubbing pressure, by heat exchange with said mixture and, after condensation, pumping said nitrogen process stream to the scrubbing pressure and mixing said nitrogen process stream with said nitrogen scrubbing stream.

22. In a process for the purification of an impure gas stream at elevated pressure by nitrogen scrubbing comprising cooling an impure feed gas stream and a nitrogen scrubbing stream;
scrubbing said impure gas with said nitrogen scrubbing stream at elevated pressure;
mixing the purified gas stream with cool, pressurized nitrogen to form a mixture in which nitrogen accumulates partly in a liquid phase;
heating said mixture by heat exchange with the impure gas stream to be cooled and the nitrogen scrubbing stream to be cooled; and
evaporating the liquid nitrogen phase of said mixture by heat exchange with the impure gas stream to be cooled and a nitrogen scrubbing stream to be cooled;
the improvement comprising:
at least partially condensing an expanded partial stream of said nitrogen scrubbing stream by heat exchange with said mixture and, after condensation, pumping said partial stream to the scrubbing pressure and mixing said partial stream with said nitrogen scrubbing stream.

23. In a process for the purification of an impure gas stream at elevated pressure by nitrogen scrubbing comprising cooling an impure feed gas stream and a nitrogen scrubbing stream;
scrubbing said impure gas with said nitrogen scrubbing stream at elevated pressure;
mixing the purified gas stream with cool, pressurized nitrogen to form a mixture in which nitrogen accumulates partly in a liquid phase;
heating said mixture by heat exchange with the impure gas stream to be cooled and the nitrogen scrubbing stream to be cooled; and
evaporating the liquid nitrogen phase of said mixture by heat exchange with the impure gas stream to be cooled and the nitrogen scrubbing stream to be cooled;
the improvement comprising:
flowing a working medium in a circuit wherein said working medium is evaporated at elevated pressure, expanded to a lower pressure during which work is extracted, and then condensed and pumped to an elevated pressure, evaporation and condensation of said working medium being performed by heat exchange with said mixture.

* * * * *